United States Patent [19]

Okamoto

[11] Patent Number: 5,101,486
[45] Date of Patent: Mar. 31, 1992

[54] PROCESSOR HAVING A STACKPOINTER ADDRESS PROVIDED IN ACCORDANCE WITH CONNECTION MODE SIGNAL

[75] Inventor: Tadashi Okamoto, Osaka, Japan

[73] Assignee: Matsushita Electric Industrial Co., Ltd., Osaka, Japan

[21] Appl. No.: 333,579

[22] Filed: Apr. 5, 1989

[30] Foreign Application Priority Data

Apr. 5, 1988 [JP] Japan .................. 63-83302

[51] Int. Cl.⁵ .................. G06F 9/26; G06F 9/34; G06F 12/00; G06F 12/02
[52] U.S. Cl. .................. 395/400; 395/775; 364/DIG. 1; 364/DIG. 2; 364/244.3; 364/254.5; 364/265.3
[58] Field of Search ... 364/200 MS File, 900 MS File

[56] References Cited

U.S. PATENT DOCUMENTS

| | | | |
|---|---|---|---|
| 3,725,876 | 4/1973 | Hauck | 364/200 |
| 3,810,117 | 5/1974 | Healey | 364/200 |
| 3,889,243 | 6/1975 | Drimak | 364/200 |
| 4,268,903 | 5/1981 | Miki et al. | 364/200 |
| 4,297,743 | 10/1981 | Appell et al. | 364/200 |
| 4,394,729 | 7/1983 | Armstrong | 364/200 |
| 4,398,244 | 8/1983 | Chu et al. | 364/200 |
| 4,405,983 | 9/1983 | Pérez-Méndez | 364/200 |
| 4,807,185 | 2/1989 | Kamiya | 364/200 |
| 4,835,738 | 5/1989 | Niehaus et al. | 364/900 |

Primary Examiner—Terrell W. Fears
Assistant Examiner—Michael A. Whitfield
Attorney, Agent, or Firm—Wenderoth, Lind & Ponack

[57] ABSTRACT

A processor having a memory for use as a stack and a stackpointer provided within the processor, includes circuits for judging a underflow and a overflow of the memory by receiving address of the stackpointer and a signal showing a stack operating instruction from an instruction decoding part in the processor, so as to be capable of calling a subroutine at a high speed, and judging and preventing an overflow or underflow of the stack.

9 Claims, 12 Drawing Sheets

STACK POINTER (SP)

SP

SP (SP = 01)

SP

SP (SP = 00)

SP

<CONNECTION MODE 0>

<CONNECTION MODE 1>

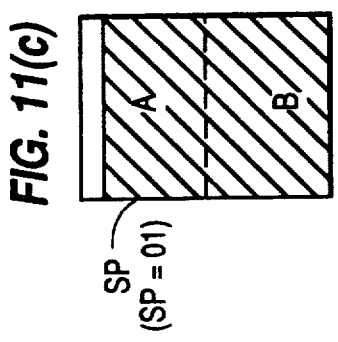
FIG. 11(c)
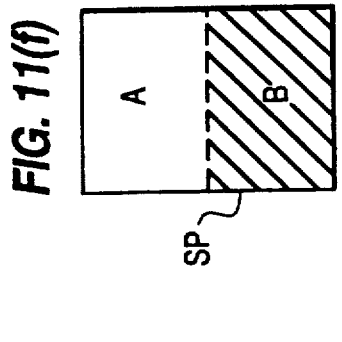
FIG. 11(f)
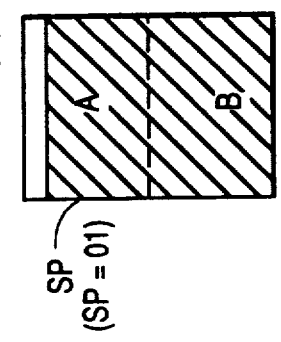
FIG. 11(b)
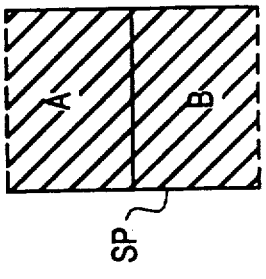
FIG. 11(e)
FIG. 11(a)
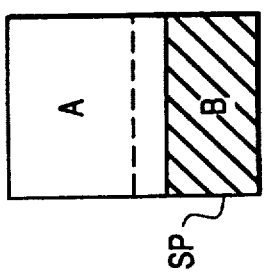
FIG. 11(d)

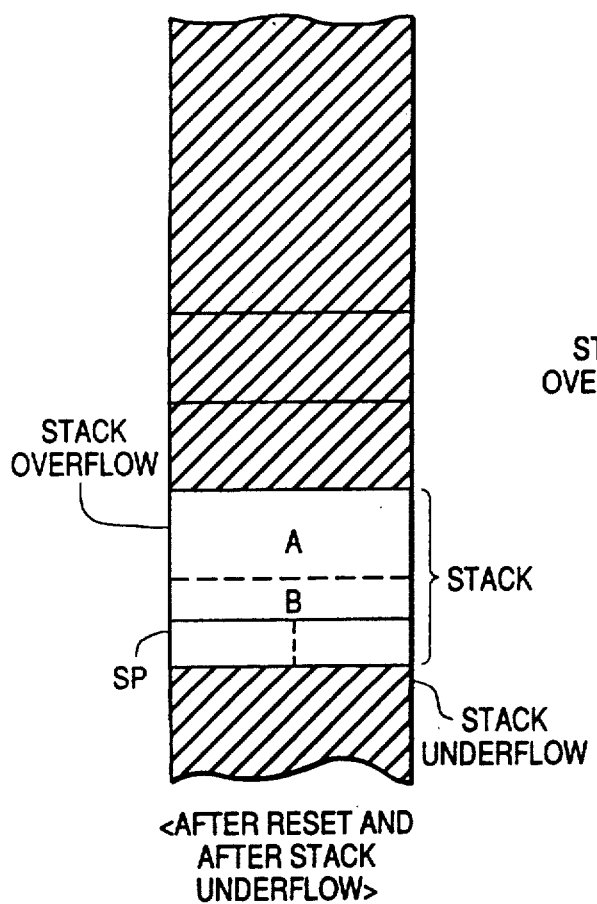
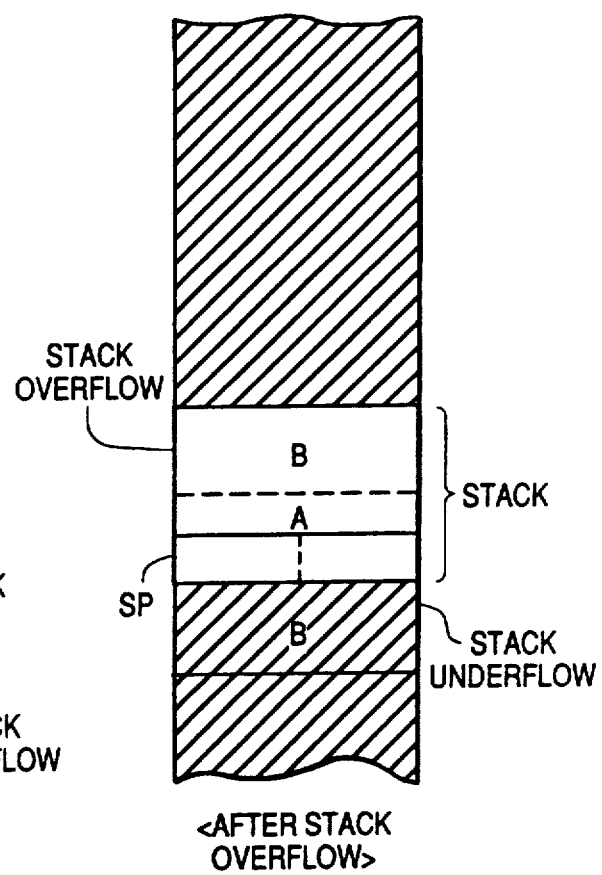
FIG. 12(a) <AFTER RESET AND AFTER STACK UNDERFLOW>
FIG. 12(a) <AFTER STACK OVERFLOW>

PROCESSOR HAVING A STACKPOINTER ADDRESS PROVIDED IN ACCORDANCE WITH CONNECTION MODE SIGNAL

BACKGROUND OF THE INVENTION

The present invention relates to a processor for processing programs.

Considering a computer or processor for processing programs, the stack is one of the important concepts. The stack means, as mentioned in "16-Bit Microcomputer and Programming Basics" (published by CQ, page 212), in a device for reading out the data in the reverse sequence of it being written in.

A conceptual drawing of a conventional processor is shown in FIG. 1. In a processor 100 shown in FIG. 1, generally, one of the registers in the processor 100 is used as a stackpointer for stack access, and one of the external memories 118 is assigned as a stack region 120 to realize a stack. The push action and pop action which are two basic actions in this stack are briefly explained below. Relating first to the push action, the initial state shown in FIG. 2(a) is supposed. At this time, the memory in the shaded area is already used. To begin with, one is substracted from the address of the stackpointer. As a result, the address of the stackpointer indicates one address before as shown in FIG. 2(b). Next, by accessing the external memory 118 from this address, the data is written in as shown in FIG. 2(c).

The pop action is then explained. The initial state is supposed as shown in FIG. 3(a). First, as shown in FIG. 3(b), the external memory 118 is accessed by the address of the stackpointer, and the date is read out. Furthermore, as shown in FIG. 3(c), one is added to the adress of the stackpointer.

The satck is mainly used in a subroutine in FORTRAN or other computer language, and at the time of subroutine call, the push action is effected in order to save the data into the stack, and when returning from the subroutine, the pop action is effected to restore the data. The action in this case is described in further detail. When the subroutine is called in the main program of the program in FORTRAN or the like, the push action is effected in order to keep the return address of the program when returning from the subroutine. First of all, by the address of the stack-pointer which is one of the registers 108 in an execution unit 106, the address of the external memory 118 is specified by using an address bus. The address of an instruction pointer 110 at a control unit 104 is written into a stack region 120 of the external memory 118 through an internal bus 112 and data bus 114. The address of the written instruction pointer is read out from the external memory 118 by the pop action when returning from the subroutine and is used in order to continue the main program. In the conventional processor 100 as shown in FIG. 1, while accessing to the stack region 120 of the external memory 118, the next instruction to be received by an instruction decoding part 120 of the processor cannot be taken in. In the above explanation, the data to be saved in the external stack region 120 is only the address of the returning destination when returning from the subroutine, but generally the data of the register in the processor 100 is also saved. In this case, the operation for taking in the next instruction is further delayed. Therefore, in the processor 100 designed to take in the data and instruction from a same data bus, when saving the data at the time of subroutine call or resetting at the time of returning, the external data bus 114 of the processor 100 is more crowded. Generally, since the cycle time for accessing the external memory 118 is greater than the machine cycle time of the processor 100, the speed of the processor 100 is lowered.

Besides, in the structure of installing memory 10 and stackpointer only as a stack part 122 inside the processor as shown in FIG. 4 in order to avoid crowdedness of the external data bus 114, the user of the processor must be always conscious so as not to use up the memory 10 completely. That is, as shown in FIG. 5(a), when the subroutine call is repeated a number of times, a certain number of words of the memory 10 in the processor 100 are used. If the capacity of the memory 10 is 32 words, when 32 words of data are written in the memory 10, no more data can be written into the memory 10 as shown in FIG. 5(b). In this state, if data is written into the memory 10 by mistake, the data to be kept is broken as shown in FIG. 5(c). In FIGS. 5(a)-5(c), the shaded areas are areas of the memory being used and the unshaded areas are areas not being used.

SUMMARY OF THE INVENTION

In the light of the above-discussed problems, it is a primary object of the invention to present a processor capable of calling the present subroutine at a high speed.

It is another object of the present invention to present a processor capable of preventing, the program from accessing the stack over the region of the stack installed in the processor, if attempted.

In order to solve the above problems, the processor of the present invention comprises a memory to be used as stack, and judging circuits for receiving the stack operating signal and the address of stackpointer from an instruction decoding part of the processor and for judging overflow and underflow of the memory, in which, in the event of an overflow or underflow, the control unit of the processor receives notification from the judging circuits to interrupt the usual operation, thereby saving the data of the stack in the proccesor into the stack region of external memory, or restoring the saved data from the stack region of the external memory.

In the above structure of the present invention, when a memory for stack is provided inside the processor, it is not necessary to access the exteral memory unless the stack overflows or underflows, so that a high speed subroutine call is realized. Moreover, the judging the circuit for judging overflow or underflow of the stack judges the possibility of destruction of the data in the stack by the processor, and interrupts the operation to prevent destruction of the data in the memory.

BRIEF DESCRIPTION OF THE DRAWINGS

FIGS. 11(a)-11(b) are explanatory drawings of the movement of the stack data of the processor in accordance with the second embodiment of the present invention; and FIGS. 12(a)-12(b) are corresponding explanatory drawings of stack and external stack regions of the processor.

DETAILED DESCRIPTION OF THE INVENTION

Figure 1:
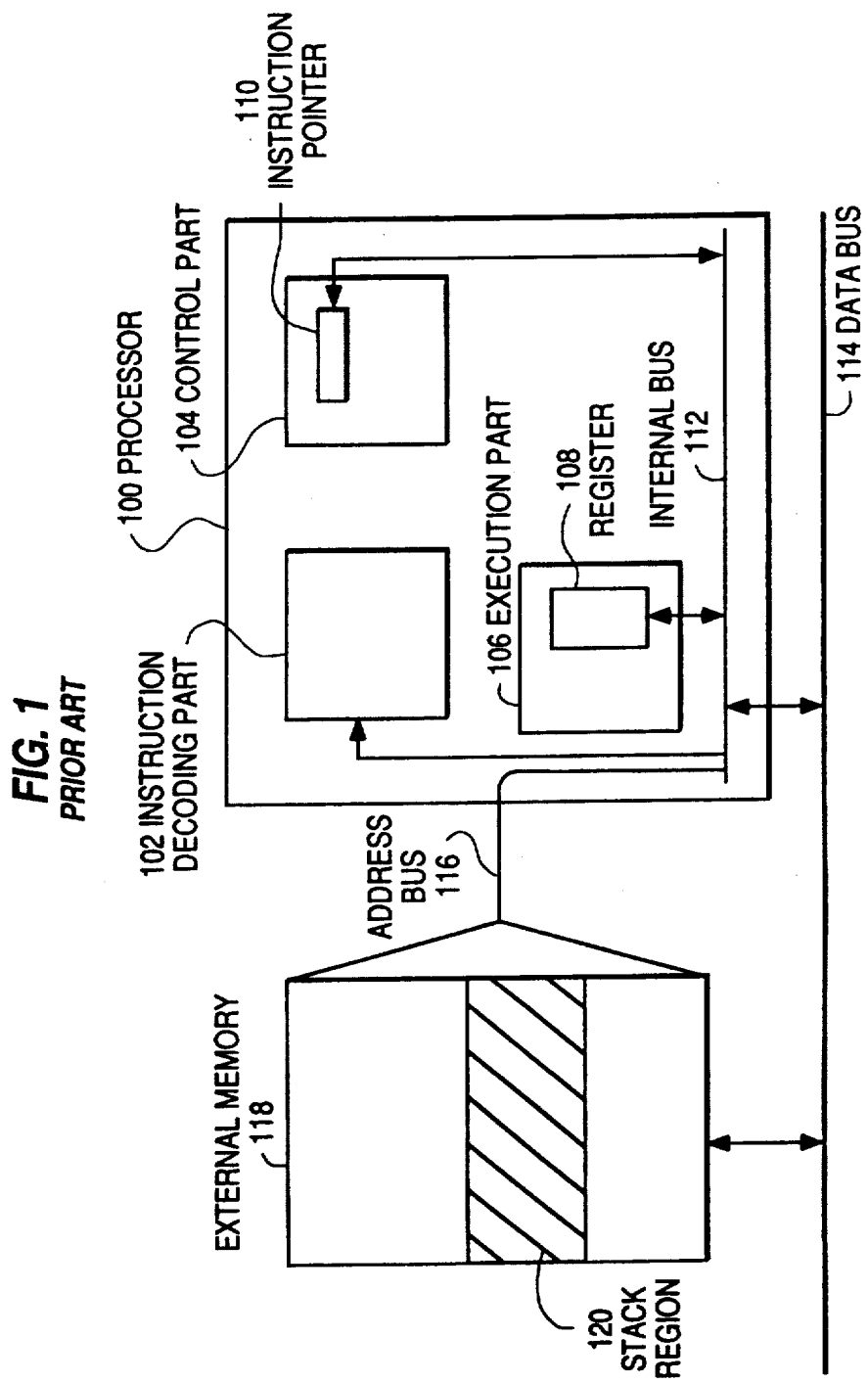
FIG. 1 is a schematic drawing of a conventional processor.
Figure 2C:
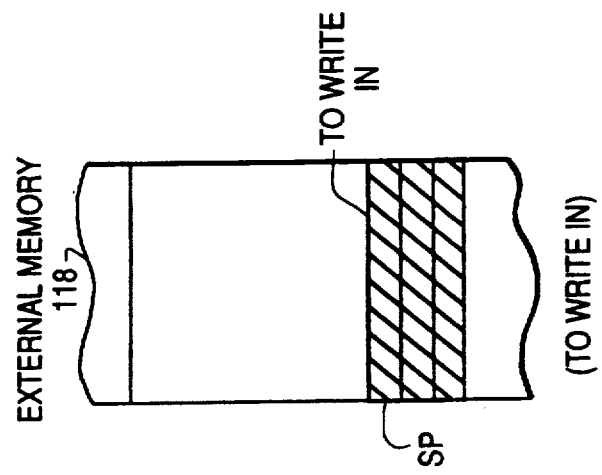
FIGS. 2(a)-2(c) are drawings for explaining the operation of writing data into the stack region.
Figure 2B:
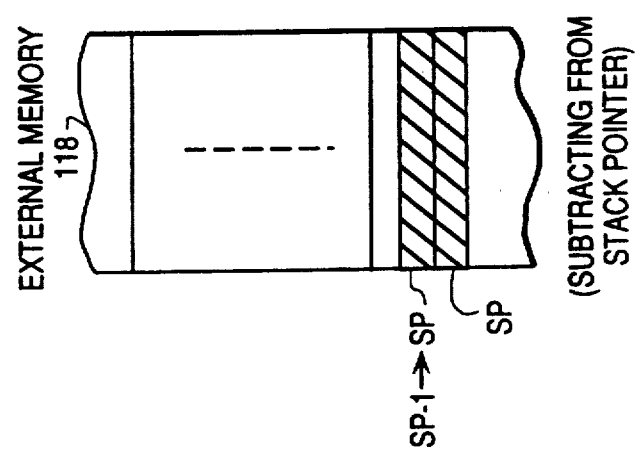
Figure 2A:
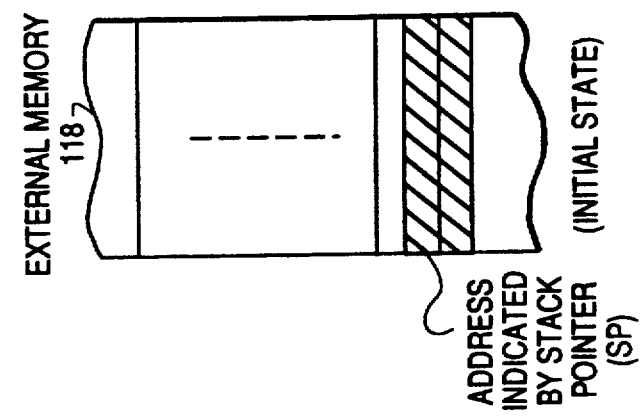
Figure 3A:
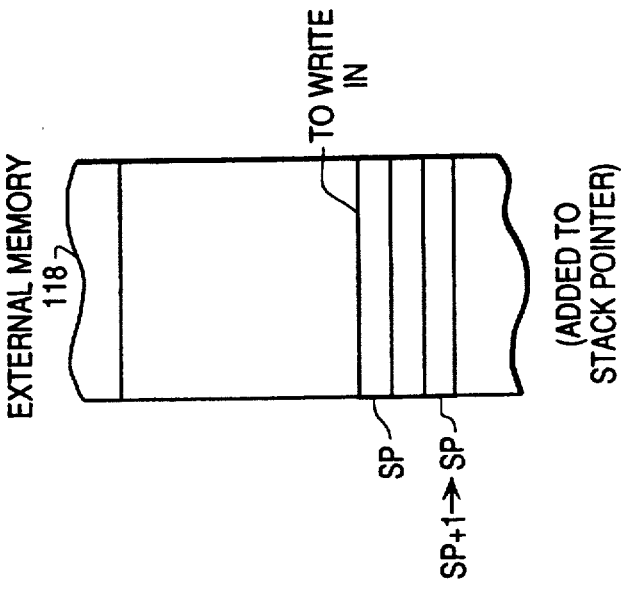
FIGS. 3(a)-3(c) are drawings for explaining the operation of reading out data from the stack region.
Figure 3B:
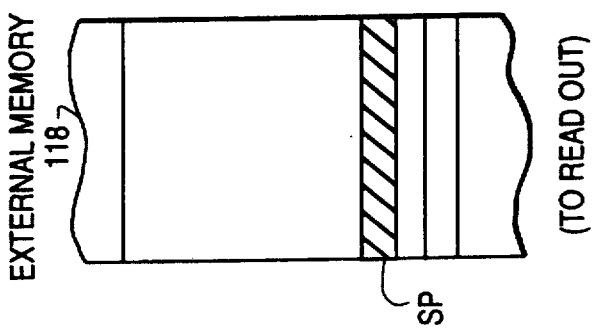
Figure 3C:
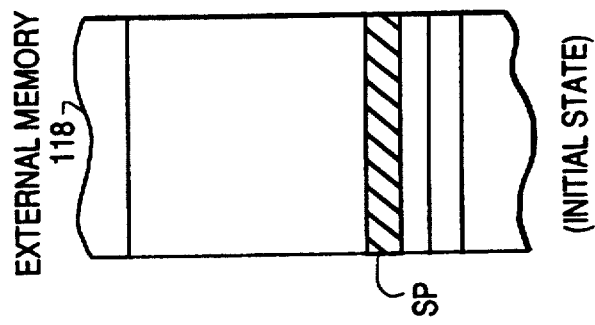
Figure 4:
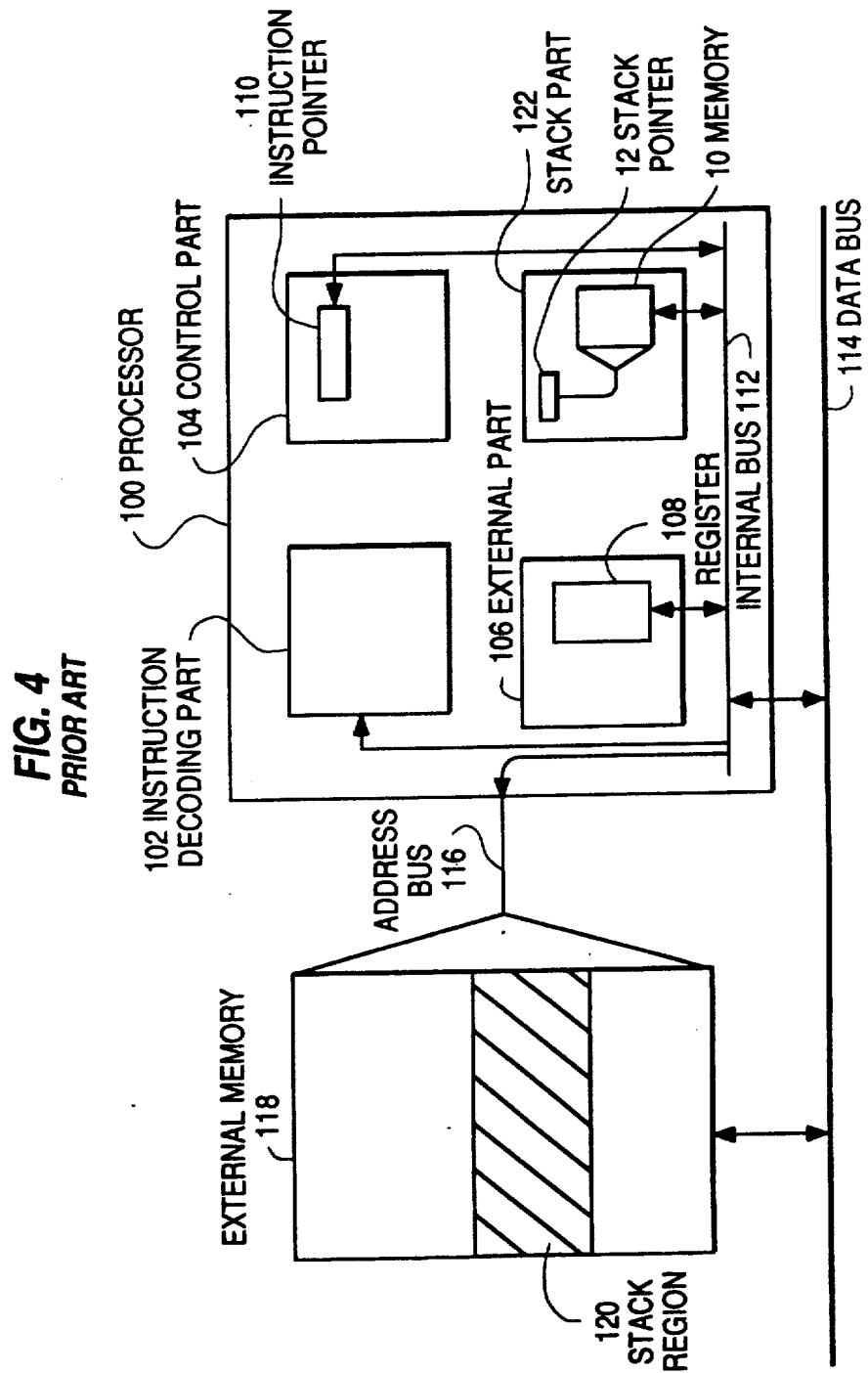
FIG. 4 is a drawing for explaining a processor incorporating a conventional stack.
Figure 5C:
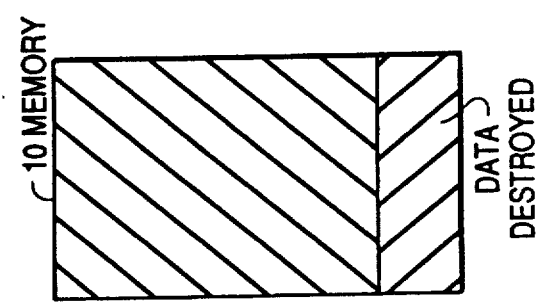
FIGS. 5(a)-5(c) are drawings for explaining the destruction of data in the stack.
Figure 5B:
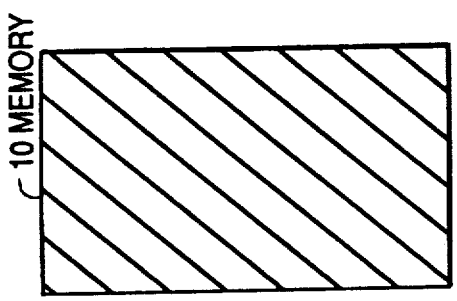
Figure 5A:
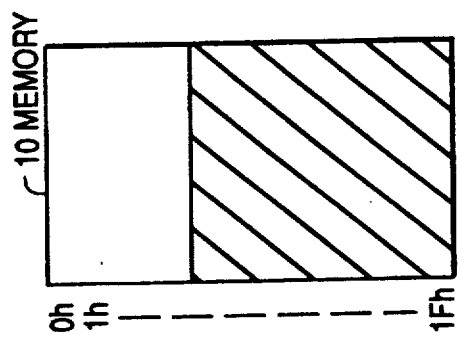
Figure 6:
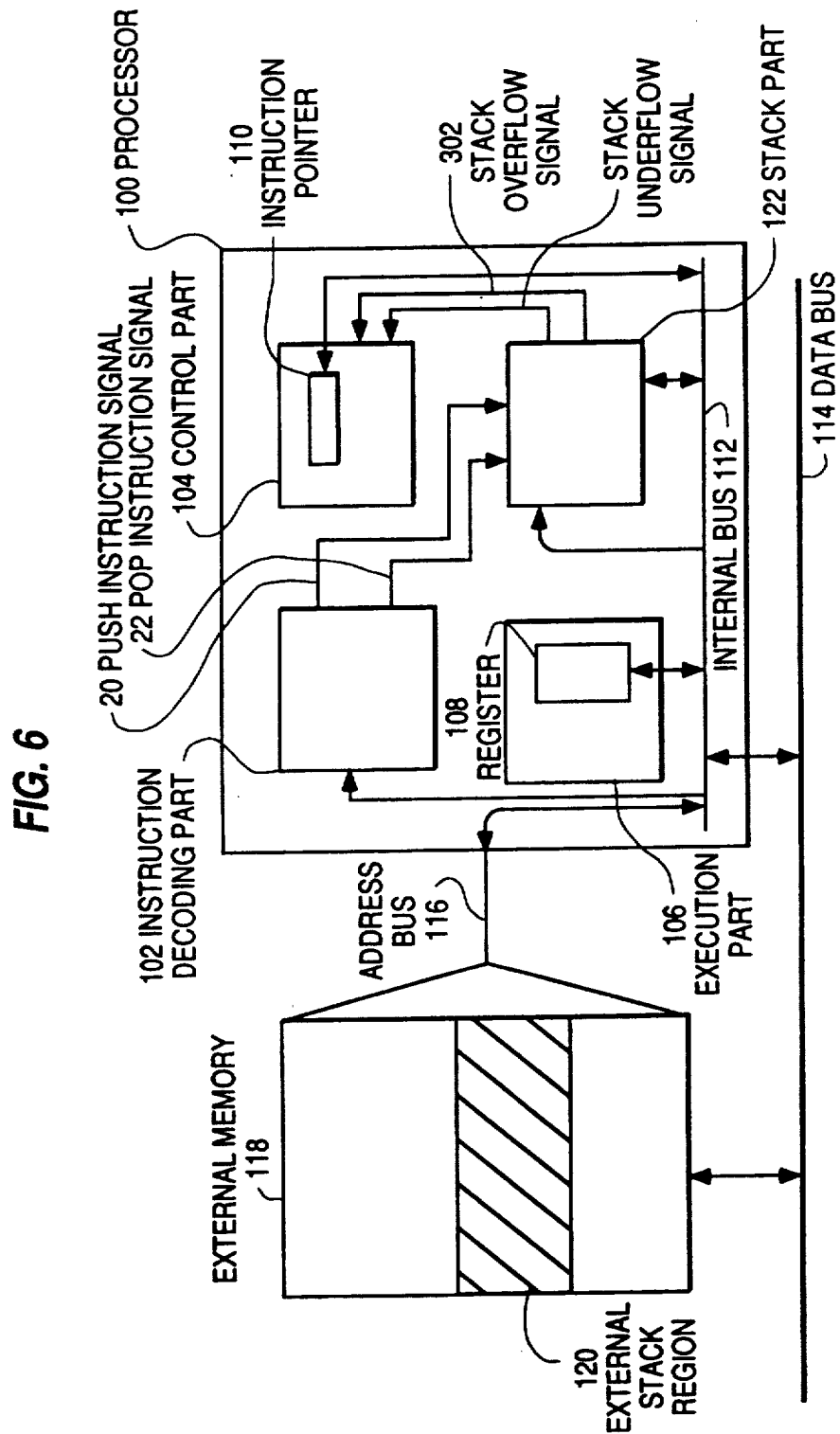
FIG. 6 is a schematic drawing of a processor in accordance with first and second embodiments of the present invention.
Figure 7:
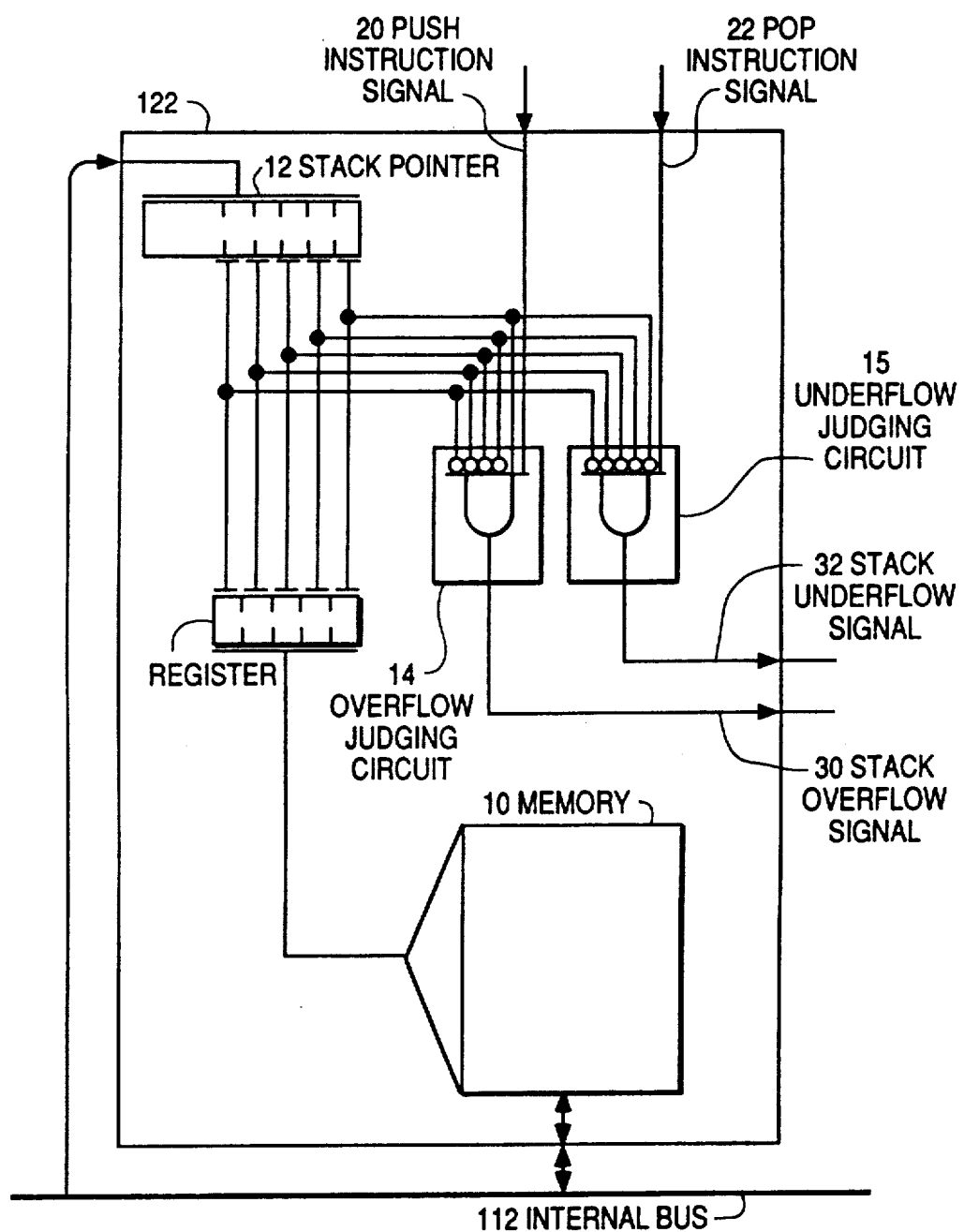
FIG. 7 is a schematic drawing of a stack part of the processor in accordance with the first embodiment of the present invention.

Referring now to the drawings, the invention is described in details below. FIG. 6 is a schematic drawing of a processor in accordance with first and second embodiments of the present invention. A processor 100 is composed of an instruction decoding part 102, a control part 104, an execution part 106, and a stack part 122. To describe the invention in further details, the stack part 122 in this invention is shown in FIG. 7.

A memory 10 is specified and accessed by the address of a stackpointer 12. Stack operating signals from the instruction decoding part 102 of the processor are a push instruction signal 20 and a pop instruction signal 22. Since the memory 10 has only a specific capacity, a stack overflow judging circuit 14 and a stack underflow judging circuit 15 for checking the region of the memory 10 used as the stack are provided. The stack overflow judging circuit 14 receives the push instruction signal 20 and the address of the stackpointer 12 from the instruction decoding part 102, and judges whether or not a stack overflow has taken place. On the other hand, a stack underflow is judged by the stack underflow judging circuit 15 which receives the pop instruction signal 22 and the address of the stackpointer 12 from the instruction decoding part 102. This operation is more practically described below. The size of the memory 10 is supposed to be 32 words, and the value of the stackpointer 12 to cause a stack overflow is 01h, and the value of the stackpointer 12 to cause a stack underflow is 00h and in which 01h, 00h are expressed in hexadecimal notation.

Figure 8A:
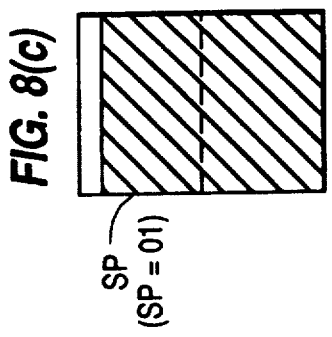
FIGS. 8(a)-8(b) are explanatory drawings of the movement of the stack data of the processor in accordance with the first embodiment of the present invention.

Right after resetting the processor 100, the lower 5-bit value of the stackpointer 12 is supposed to be 00h. For example, in the state of writing 00h into the stackpointer 12 from an internal bus 112, as shown in FIG. 8(a), the processor 100 possesses a stack region capable of pushing the remaining 32 words. Within the limit of the memory 10, it is not necessary to access an external memory 118 for pushing in the memory 10 in the push operation of the data occurring at the time of subroutine call, so that the subroutine call may be made at a high speed. In FIGS. 8(a)-8(f), the shaded areas are areas of the memory being used and the unshaded areas are areas not being used.

Figure 8B:
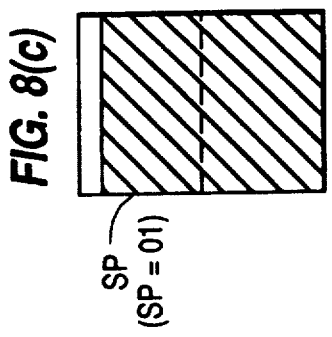
Figure 8C:
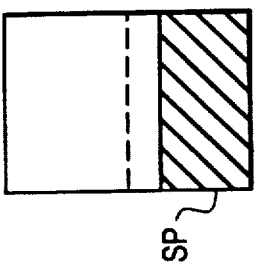
Figure 8D:
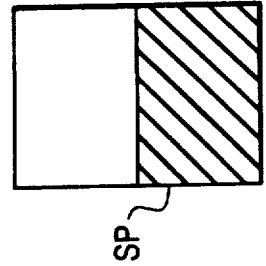

However, as the subroutine call is repeated, the usable region of the memory 10 decreases as shown in FIG. 8(b). Finally, as shown in FIG. 8(c), the stackpointer 12 as the limit of the memory 10 becomes 01h. If a further attempt is made to effect a push instruction in this state, the stack overflow judging circuit 14 receives a push instruction signal 20 and the address of the lower 5 bits of the stackpointer 12 from the instruction decoding part 102, and judges the stack over flow. This stack overflow judging circuit 14 then, using a stack overflow signal 30, transmits the stack overflow to the control part 104. The control part 104 receives it, and stops the push instruction execution to interrupt it. In the interruption processing, the data for the portion of 16 words corresponding to the half of the data is saved in a prepared external stack region 120, and it is programmed so that the remaining valid data is shifted by the portion of 16 words. It is further programmed to add 10h to the address of the stackpointer 12. After the interruption processing, the memory 10 is ready to execute the push instruction and pop instruction as shown in FIG. 8(d).

Figure 8E:
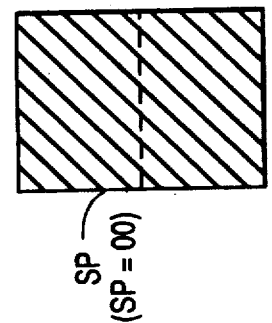
Figure 8F:
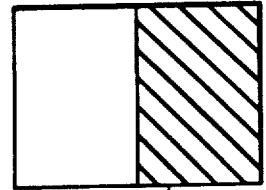

Afterwards, when the return action of the subroutine is repeated, all the data in the region of the memory 10 is used up as shown in FIG. 8(e). Here, if an attempt is made to execute the pop instruction further, the stack underflow judging circuit 15 receives a pop instruction signal 22 and the address of the lower 5 bits of the stackpointer 12 from the instruction decoding part 102, and judges the stack underflow. The stack underflow judging circuit 15 then, by using a stack underflow signal 32, transmits the stack underflow to the control part 104. The control part 104, receiving it, stops the pop instruction execution, and interrupts it. In the interruption processing, the data for the portion of 16 words previously saved due to overflow is returned from the external stack region 120 to the memory 10 in the processor 100, and it is programmed to substract 10h from the address of the stackpointer 12. After the interruption processing, as shown in FIG. 8(f), the memory 10 is ready to push and pop. In this way, by adding the stack overflow judging circuit 14 and stack underflow judging circuit 15 for judging the remainder of the memory 10, it is possible to restore the data previously stored in the memory 10, if the stack is used up completely.

Figure 9:
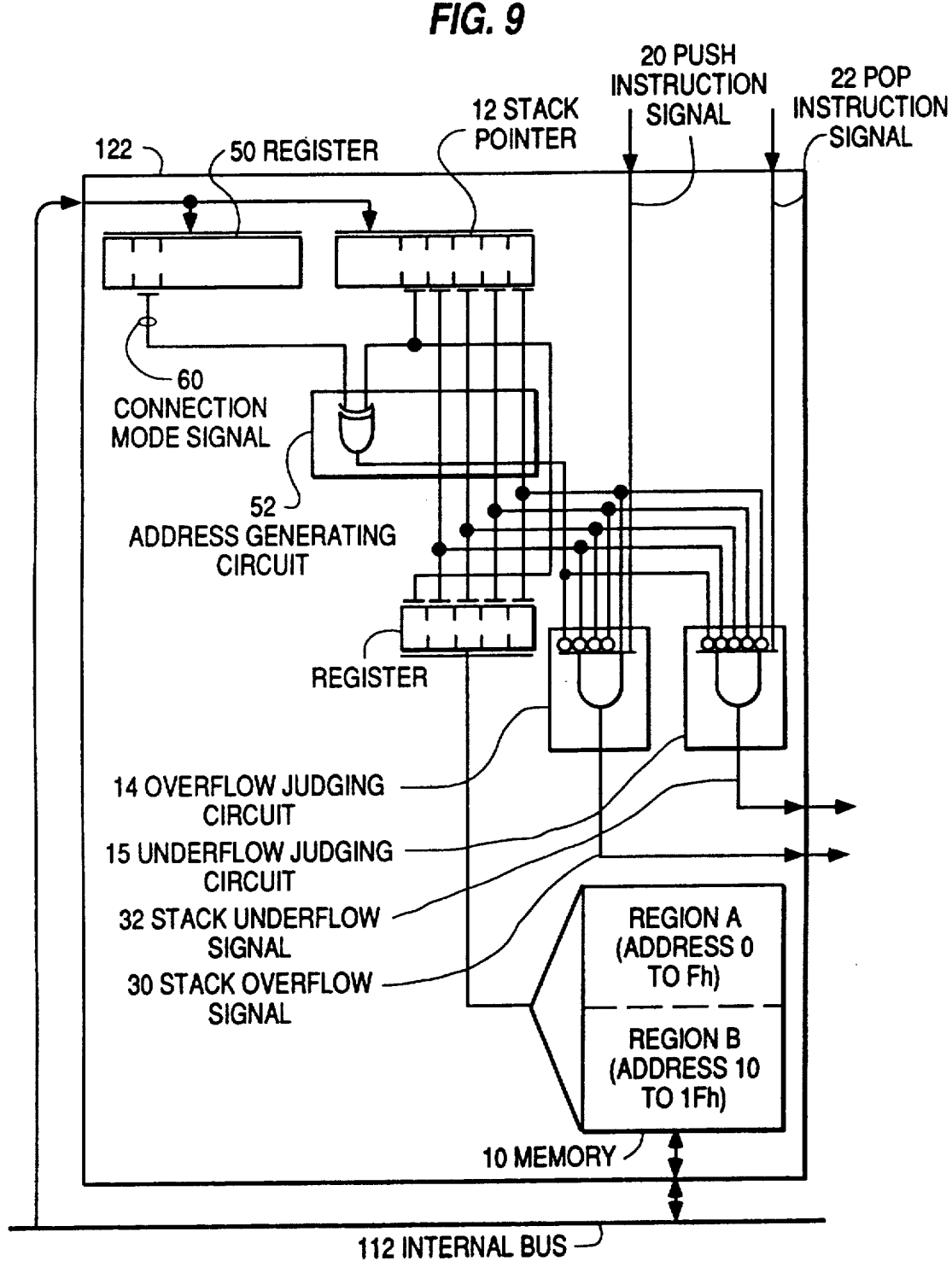
FIG. 9 is a schematic drawing of a stack part of the processor in the second embodiment of the invention.

The stack part 122 of the processor 100 in the second embodiment of the invention is shown in FIG. 9.

The internal structure of the processor 100 is same as in the first embodiment. Stack operating signals from the instruction decoding part 102 are a push instruction signal 20 and a pop instruction signal 22. A register 50 is provided in order to store a signal indicating the connection mode when the memory 10 to be used as the stack in the processor is divided into two halves. Here, same as in the first embodiment, the size of the memory 10 is 32 words. An address generating circuit 52 receives a connection mode signal 60 and the address of the lower 5 bits of the stackpointer 12 from the register 50, and generates a stack address. This address generating circuit 52 directly delivers the lower 4 bits of the address of 5 bits from the stackpointer, and delivers the top 1 bit by calculating the logic of exclusive OR (EOR) with the connection mode signal 60. Therefore, in the address generating circuit 52, when the connection mode signal 60 is zero, the stackpointer is directly delivered, and when the connection mode signal is a "1", the fifth bit of the stackpointer is inverted and delivered. Therefore, when the regions of the memory divided into two halves are supposed to be memory region A from address 0h to Fh, and memory region B from address 10h to 1Fh, it is operated so that they are connected in the sequence of A, B when the connection mode signal 60 is a "0", and B, A when the connection mode signal 60 is a "1", logically, because the fifth bit of the address for accessing the memory is inverted. The stack overflow judging circuit 14 and stack underflow judging circuit 15 in the second embodiment are same in structure as those of the first embodiment.

The actual operation is explained below.

Right after resetting the processor, the address of the lower 5 bits of the stackpointer 12 is 00h. The register 50 for storing the connection mode signal 60 is a "0". Therefore, in the address generating circuit 52, the address of the stackpointer 12 is the stack address. In this state, as shown in FIG. 11(a), the processor possesses the region capable of pushing the remaining 32 words. In this case, the memory 10 replaces the external memory 118 as shown in FIG. 12(a). By effecting the push operation continuously, within the limit of the memory 10 used as the stack, it is not necessary to access the external memory, so that a subroutine call at a high speed is realized. In FIGS. 11(a)-11(f), the shaded areas are areas of the memory being used and the unshaded areas are areas not being used.

Figure 10A:
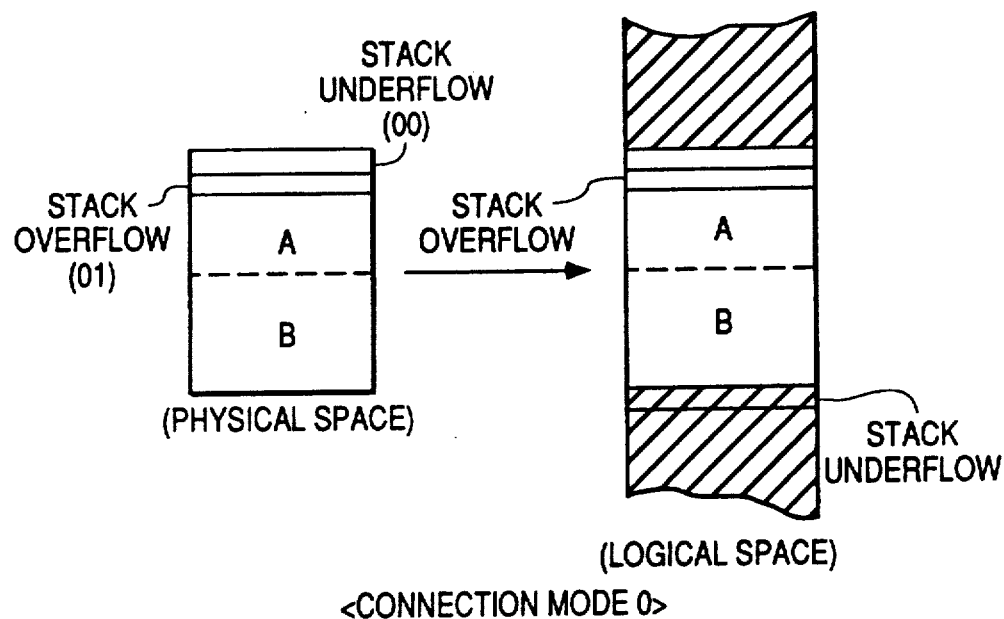
FIGS. 10(a)-10(b) are explanatory drawings of the connecting state of the stack in the connection mode.
Figure 10B:
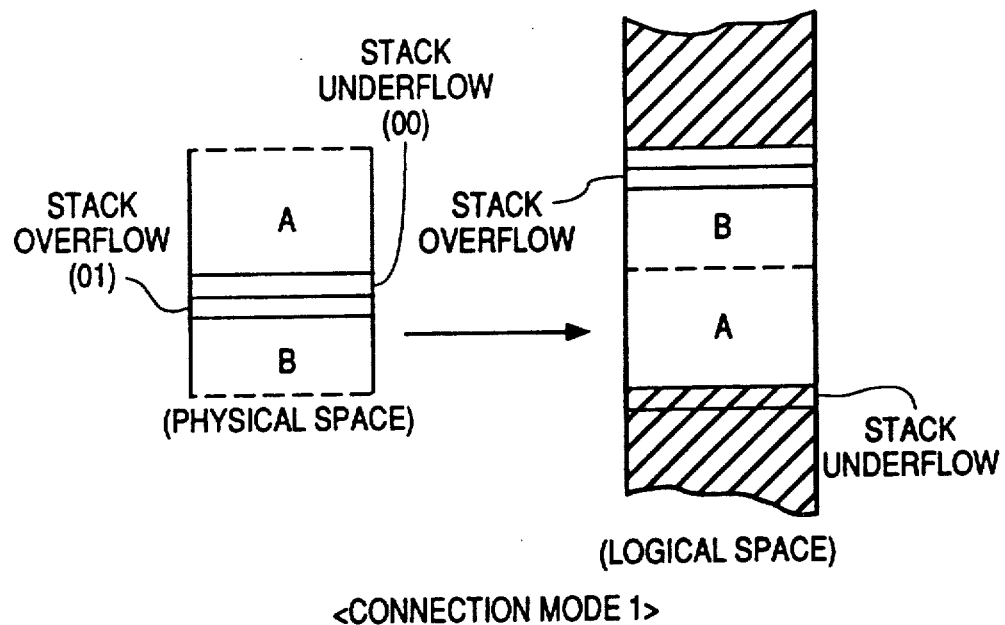

However, as shown in FIG. 11(b), by repeating the subroutine calls, the usable region in the stack 10 decreases. Finally, as shown in FIG. 11(c), the address of the stackpointer 12 as the limit of this memory 10 becomes 01h. When an attempt is made to perform further push instructions here, the stack overflow judging circuit 14 receives a push instruction signal 20 from the instruction decoding part 102 of the processor and the 5-bit address from the address generating circuit 52, and judges the stack overflow. Then, the stack overflow judging circuit 14, using a stack overflow signal 30, transmits the stack overflow to the control part 104. The control part 104, receiving it, stops the push instruction execution, and interrupts it. In the interruption processing, the data for the portion of 16 words corresponding to the half data is saved into a prepared external stack region 120, and the register 50 for storing the connection mode is changed from a "0" to a "1". After the interruption processing, as shown in FIG. 11(d), the memory 10 is ready to push and pop. At this time, the corresponding external memory 118 of the memory 10 is moved 16 words up as shown in FIG. 12(b). The address generating circuit 52 inverts the 5-bit value of the stackpointer for generating a stack address operates the stack as shown in FIG. 10(b). Furthermore, the stack overflow judging circuit 14 check the overflow and underflow in the boundary of the stack as shown in FIG. 10(b).

At the same time, when the external stack region 120 is also checked, it is possible to be used in detection of overflow and underflow of the external stack region 120. Afterwards, when the return action of subroutine is repeated, all the data in the region of the memory 10 is used up as shown in FIG. 11(e). When an attempt is made here to perform further pop instructions, the stack underflow judging circuit 15 receives a pop instruction signal 22 from the instruction decoding part 102 of the processor and the 5-bit address from the address generating circuit 52, and the stack underflow is judged. Then, the stack underflow judging circuit 15, using a stack underflow signal 32, transmits the stack underflow to the control part 104. The control part 104, receiving it, stops the pop instruction execution and interrupts it. In the interruption processing, as shown in FIGS. 12(a)-12(b), the data for the portion of 16 words being saved due to the previous stack overflow must be restored from the external stack region 120. After the interruption processing, as shown in FIG. 11(f), the memory 10 is ready to push and pop. Meanwhile, at this time, the memory 10 replaces the external memory 118 as shown in FIG. 12(a). In this way, by attaching the stack overflow judging circuit 14 and stack underflow judging circuit 15 for judging the remainder of the memory 10, it is possible to restore the data previously stored in the memory 10 even if the stack is completely used up. In addition, since register 50 for storing the connection mode is provided, a change of the stackpointer 12 may be avoided.

Thus, in this invention, by taking in the memory as a stack region, the subroutine call may be effected at a high speed unless the memory overflows or underflows.

By adding the circuits for judging the stack region, overflow and underflow of the stack in the processor can be judged. Furthermore, by checking the stack region of the external memory during interruption of the stack overflow and underflow, detection of overflow and underflow of the external stack region is also possible.

Furthermore, by providing a connection mode of connection of the stack divided into two halves, change of the stackpointer in the interruption processing, and movement of data in the stack are unnecessarily.

In the first and second embodiments, the size of the memory was defined as 32 ($2^5=32$) words, but similar effects will be obtained when the memory size is $2^N$ (N: a positive integer).

What is claimed is:

1. A processor comprising:
   an instruction decoding part;
   a control part for generating a connection mode signal;
   an execution part;
   a stack pointer, consisting of n-bits, n being a positive integer;
   a memory used as a stack, which is addressed by said stack pointer;
   an address generating circuit, which generates a bit by gating an exclusive OR of a most significant bit of said stack pointer and said connection mode signal;
   a judging circuit for judging an overflow and an underflow of said stack by receiving said bit from said address generating circuit, bits of the n-bits of said stack pointer other than a most significant bit thereof, and stack operating signals from said instruction decoding part.

2. A processor comprising:
   an instruction decoding part;
   a control part for generating a connection mode signal;
   an execution part;
   a stack pointer consisting of n bits, n being a positive integer;
   a memory used as a stack and addressable by said stack pointer;
   an address generating circuit for generating an address in response to receiving said stack pointer and said connection mode signal;
   a judging circuit for judging an overflow or an underflow of said stack in response to receiving said address from said address generating circuit and stack operating signals from said instruction decoding part;
   wherein an address indicating said overflow or said underflow of said stack in said judging circuit is changed in accordance with said connection mode signal.

3. A processor according to claim 2, wherein said address generating circuit delivers an address from said stack pointer without changing it when said connection mode signal is 0h, and when the connection mode signal is 1h, delivers said address from said stack pointer after having inverted a most significant bit thereof.

4. A processor according to claim 3, wherein said address for judging said overflow in said judging circuit is 1h, and said address for judging said underflow is 0h.

5. A processor according to claim 4, wherein said control part places the processor in an interrupt state from a normal state when an output from said judging circuit indicates either said overflow or said underflow.

6. A processor comprising:
an instruction decoding part;
a memory made of $2^N$ words used as a stack;
a control part for generating connection mode signal;
wherein said memory is divided into a region I from address 0 to $2^{N-1}-1$ and a region II from address $2^{N-1}$ to $2^N-1$, N being a positive integer;
a stack pointer;
an address generating circuit for receiving an address from said stack pointer and said connection mode signal and for generating a corresponding address for accessing said memory by calculating the exclusive OR of a highest ordered bit of said address from said stack pointer and said connection mode signal and for delivering the bits other than the highest ordered bit of said address from said stack pointer directly;
a first judging circuit for judging a stack overflow when said address from said stack pointer is 01h by receiving said corresponding address from said address generating circuit and a stack push instruction from said instruction decoding part, and a second judging circuit for judging a stack underflow when said address from said stack pointer is 00h by receiving said corresponding address from the address generating circuit and a stack pop instruction from said instruction decoding part.

7. A processor comprising:
an instruction decoding part;
a control part for generating a connection mode signal;
an execution part;
a memory used as a stack;
a stack pointer;
an address generating circuit for generating an address for accessing said memory by receiving an address from said stack pointer and said connection mode signal; and
judging circuits for judging an overflow and an underflow of said memory by receiving said address from said address generating circuit and a stack operating signal from said instruction decoding part;
wherein a capacity of said memory is $2^N$ words, N being a positive integer, and when said address for accessing said memory is from 0 to $2^N-1$, said memory is divided into a first half from address 0 to $2^{N-1}$ and a second half from address $2^{N-1}$ to $2^N-1$, and wherein said address generating circuit, when said connection mode signal is a "0", delivers said address of the stack pointers as an output without changing it, and, when said connection mode signal is a "1", inverts a highest ordered bit of said address from said stack pointer prior to delivering it as an output so as to access said memory by exchanging said first half of said memory and said second half of said memory, thereby accessing said memory.

8. A processor according to claim 7, wherein said address for judging said overflow in said judging circuit is a 1, and said address for judging said underflow in said judging circuit is a 0.

9. A processor according to claim 8, wherein the processor is transferred from a usual program execution state to an interruption processing state when an output from either of said judging cicuits indicates either said overflow or said underflow.

* * * * *